April 18, 1939.   A. B. TRENCAVEL   2,154,646
HOT WATER HEATING DEVICE
Filed Feb. 5, 1937   2 Sheets-Sheet 1

INVENTOR.
Albert B. Trencavel
BY Irving Seidman
HIS ATTORNEY.

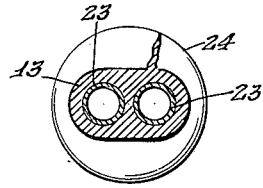
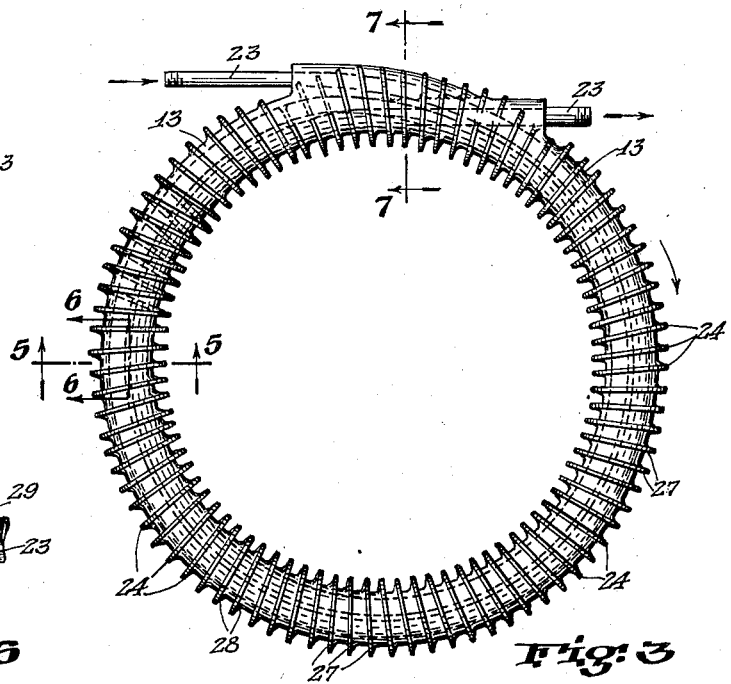
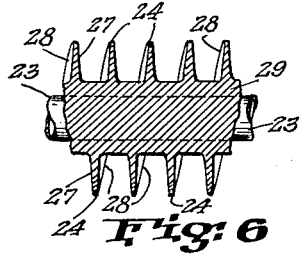
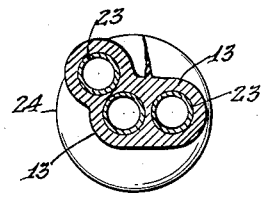
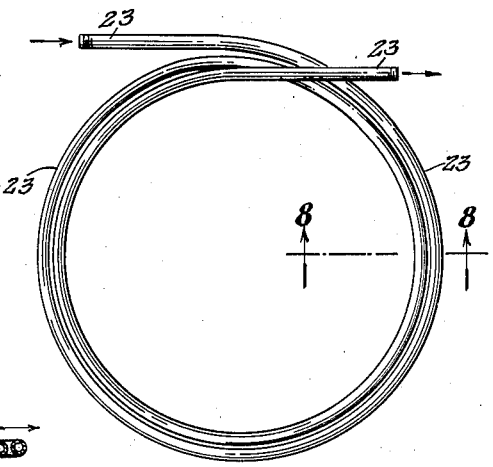

Patented Apr. 18, 1939

2,154,646

UNITED STATES PATENT OFFICE 2,154,646

HOT WATER HEATING DEVICE

Albert B. Trencavel, New York, N. Y., assignor, by direct and mesne assignments, to American Hot Water Systems, Inc., a corporation of Delaware Application February 5, 1937, Serial No. 124,204

6 Claims. (Cl. 122—20)

This invention relates to a system of utilizing the deflected waste heat from sources such as stoves, coffee urns, broilers and ovens of various types.

Broadly, it is an object of this invention to provide a device for the heating of water and to create a more rapid circulation of the heated water so that a greater amount of hot water can be stored in a tank during a given period.

More specifically, it is an object of this invention to provide for a type of heating device which will fit within the average known stove, range, oven, broiler, coffee urn and the like, so that no material variation need be made to such article in order to make an installation of the heating device.

Another object of this invention is to cause a progressive and continuous movement of water in the process of being heated by utilizing the deflected and refracted heat in stoves, ovens, ranges and the like.

Another object of this invention is to produce sufficient hot water, virtually without cost, by utilizing the waste heat of stoves, ovens, ranges and the like.

Another object of this invention is to increase the heat absorbing surface of the device in order to increase the temperature of the water in the process of being heated and aiding such water to travel faster along heat pressure lines in order to more rapidly fill a storage tank.

Another object of this invention is to provide a device having an inlet and outlet along tangential lines so that the cold water flowing in and the hot water leaving the device for the storage tank will not be retarded by any abrupt angles in the water pipe and will move in the direction of the tangent created by the water pipe and the coil thus reducing any resistance in the flow.

This invention comprises a novel construction, a combination of elements and an arrangement of parts and the device possesses characteristics, features, properties and relation of elements all of which will be exemplified in the following detailed description. For a fuller understanding of the nature and objects of this invention, reference is had to the following detailed description in connection with the accompanying drawings, in which:

Figure 3 is a top view of the circular housing of the water coil.

Figure 4 is a top view of the water coil which is incased within the circular housing.

Figures 5, 6 and 7 are cross sections taken through the circular helicoidal housing, along lines 5—5, 6—6, 7—7, respectively, of Figure 3.

Figure 8 is a cross section taken through a water coil, along line 8—8 of Figure 4.

Figure 1:
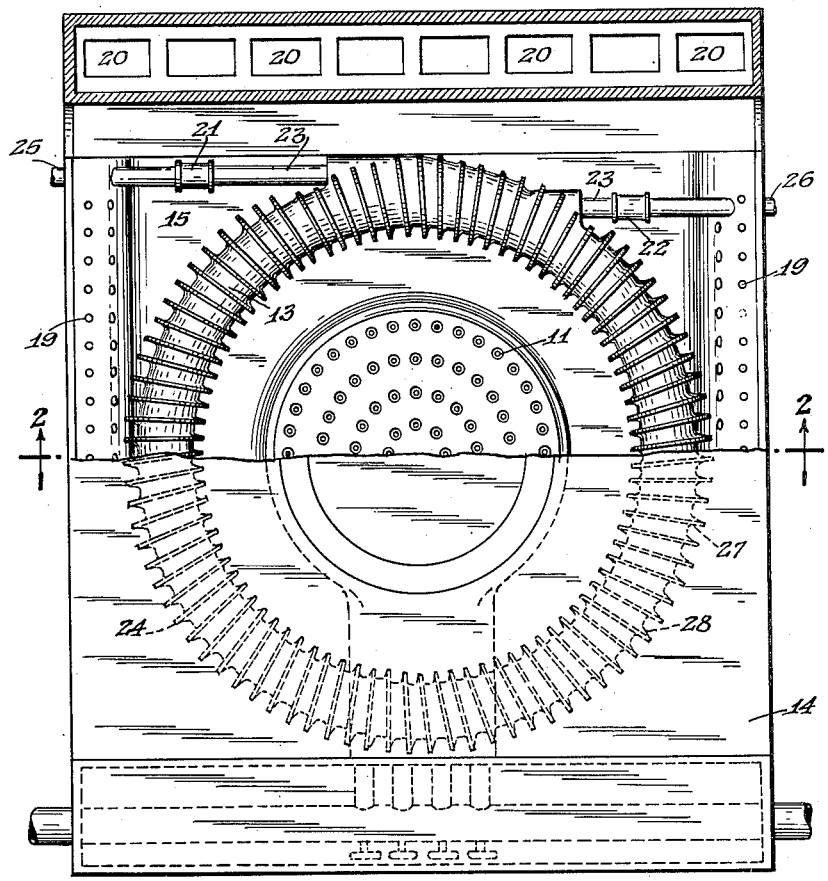
Figure 1 is a top view, partly in section, of a gas range containing the heating device used in connection with the invention.
Figure 2:
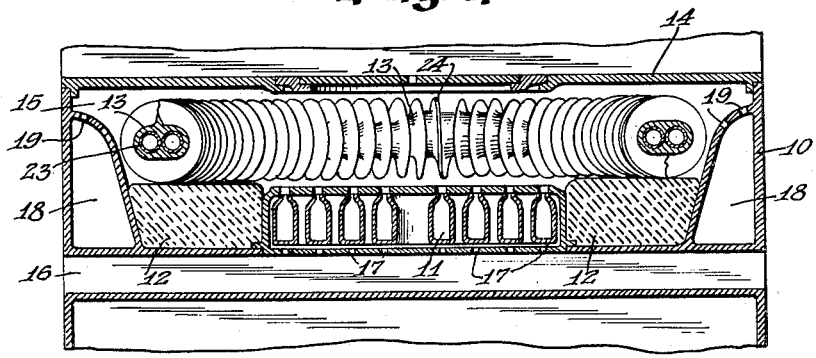
Figure 2 is a vertical section taken through a portion of the gas range, along line 2—2 of Figure 1.

Referring to the drawings, 10 represents the gas range frame, 11 the gas burner in said frame, 12 designates the refractory brick foundation around the gas burner and underneath the circular helicoidal housing 13. The gas range top 14 is supported by the gas range frame 10 above the circular helicoidal housing and the gas burners at sufficient distance to get the maximum benefit from the flame of the gas burner 11.

The gas range frame 10, surrounds the chamber 15 in which combustible gases accumulate in the said combustion chamber 15 lying between the refractory brick foundation 12 and the gas range top 14.

When the burner 11 is in operation, a column of air enters the chamber 15 through the air passage 16 in the gas range frame 10 and thence through the air passages 17 of the gas burner 11, the heated combustible gases collecting in the combustible chamber 15 and passing thence into the lateral flues 18, thence through the apertures 19 in the said lateral flues 18 and thence passing through the vertical flues 20 in the regular manner well known in the manufacture of stoves, ranges and the like.

Within the combustion chamber 15 in which the combustible gases accumulate, the circular helicoidal housing 13 rests upon but is not attached to the refractory brick foundation 12, said helicoidal housing 13 being supported by the water coil 23 which is connected to piping 25 and 26 coming from and leading to a water tank, respectively, said piping 25 and 26 being connected to the terminals of the water coil 23 by streamlined couplings 21 and 22. The helicoidal housing may be oval, square or other practical or suitable shape. The water coil 23 is solidly incased and embedded within the circular helicoidal housing 13, which completely surrounds the gas burner 11 and lies above the said gas burner 11 and within the combustible chamber 15, so that when the gas burner 11, is in operation the heat of the flame from the said gas burner will be deflected from the bottom of the gas range top 14 and be deflected toward the circular helicoidal housing 13 and the refractory brick foundation 12 upon which it rests so that the deflected heat will be absorbed by the fin-like ridges 24, radiating from the circular helicoidal housing 13, not only directly, but also indirectly from the deflection of the heat from the refractory brick foundation 12.

The circular helicoidal housing 13 may be cast from a highly heat absorbing metal such as aluminum, copper, nickel, antimony or alloys comprising such metals or compositions of such metals. The water coil 23, which is firmly incased and completely incased within the said circular helicoidal housing, is formed of a suitable non-corrosive metal, such as, copper or the like and is embedded in a horizontal spiral within the said circular helicoidal housing 13.

The inlet of the water coil 23 lies on the same plane with the greater portion of the spiral water coil 23 but the outlet rises gradually and slightly above the spiral water coil 23, since the water is hot when it leaves the water coil 23 and has a tendency to rise thus furthering the acceleration of the water flow. The inlet and the outlet are purposely placed in a tangent to the circle of the helicoidal housing 13 in order to reduce the resistance to a minimum, of the inflowing cold water and the outflowing hot water, such hot water therefore does not have to move against any angular joining.

A preferred means of solidly and firmly incasing the water coil 23 would be to place the said water coil 23 within the casting mold so that it will act as a core and the metal which forms the circular helicoidal housing is cast around the water coil 23 so that the hardened casting will have within the center thereof, the water coil 23 firmly and solidly embedded, as shown in Figure 3.

The circular helicoidal housing 13 has radiating therefrom, fin-like ridges 24, said ridges having a straight face 27 on the clock-wise side (on the side of the water flow) and perpendicular to the surface of the housing; the opposite side 28 of the said fin-like ridge 24, slopes downwardly along a curve and toward the surface of the housing 13 and merges gradually into the surface of said housing 13.

The heat which is deflected from the bottom of the gas range top 14, is gathered by the helicoidal fin-like ridges 24, which are directly in path of the deflected heat. This deflected heat is collected by the exposed surface of the finlike ridges 24, and creeps along such ridges and toward the base 29 of such ridges gathering in thermal or heat zones, such heat zones being formed between the straight side 27 of the fin-like ridge 24 and the sloping side of curved face 28 of such fin-like ridges 24. The thermal creep produced by the concentrated heat along the thermal zone at the base 29 of the fin-like ridge 24 is now carried through the metal structure of the circular housing 13 and thence carried to the inner surface of the water coil 23. The thermal or heat zones are thus transferred to the inner surface of the water coil 23, producing a continuous helicoidal thermal heat zone which is a replica of the helocoidal construction of the fin-like ridges 24 around the housing 13. This continuous heat zone forms a thermal helicoidal path around the inner surface of the water coil 23.

The heat which is refracted from the refractory brick foundation 12 is of lesser intensity due to heat loss by absorption of the brick foundation. The action of this refracted heat upon the lower part of the fin-like ridges 24 produces the same thermal creep of the heat toward the base 29 of the fin-like ridges 24. However, the refracted heat is of lesser degree than the deflected heat from the bottom of the top of the gas range 14. It will therefore follow that the thermal helicoidal path around the inner surface of the water coil 23, will have a greater temperature at the upper part than the lower. This difference of temperature between the upper and lower part of the thermal helicoidal path, produces a thermal thrust or stress in the metallic structure along the helicoidal path. The sloping face 28 of the fin-like ridge 24 is curved to offer a greater absorbing surface to collect deflected or refracted heat and to carry such heat gradually toward the perpendicular face of the next fin-like ridge. The helicoidal zone between the fin-like ridges 24 is of a lesser degree of heat than at the base 29 of the fin-like ridges 24, producing a horizontal thermal thrust or stress along the circular structure of the housing 13.

The heat transferred to the water in the water coil 23 along the helicoidal thermal path has a tendency to cause the water to rise and expand and then to follow along the helicoidal thermal path clockwise, gathering thermal momentum as the water rises in temperature. The kinetic and molecular energy released by the rise in temperature of the water creates a state of turbulence in the water causing acceleration of flow of the heat in the water of the water-coil and thence transmitted to the water in the storage tank.

I claim:

1. In a water heating device, continuous endless helicoidal fin-like ridges projecting from an annular housing for absorbing heat, said housing having embedded within the center thereof a water coil, said water coil being wound spirally in a horizontal plane.

2. In a water heating device, continuous endless helicoidal fin-like ridges projecting from an annular housing for absorbing heat, said fin-like ridges having a perpendicular side to the surface of the housing and a sloping side, said housing having embedded within the center thereof a water coil, said water coil being wound spirally in a horizontal plane.

3. In a water heating device, endless helicoidal fin-like ridges for absorbing heat projecting from an annular housing, said housing having embedded within the center thereof a horizontally wound spiral water coil.

4. A device of the character described, comprising a horizontally wound spiral water coil, a cast annular housing around said water coil, said housing having eminating therefrom projecting fin-like ridges for the collecting of heat, said ridges being along an endless helicoidal path, said water coil having terminals for connection to pipes leading to and from a water tank.

5. A device of the character described, a horizontally and spirally wound water coil comprising a cast annular housing surrounding said water coil for collecting waste heat, said horizontally and spirally wound water coil embedded within said housing, said housing having projecting therefrom continuous fin-like ridges for the collecting of heat, said ridges being along an endless helicoidal path to create heat zones for accelerating the thermal flow of heat in the water of the said water coil, said water coil having terminals for connection to pipes leading to and from a water tank.

6. A device of the character described comprising an annular housing having embedded within the center thereof a horizontally wound spiral water coil, said housing having projecting therefrom helicoidal fin-like ridges for gathering waste heat in thermal or heat zones, the heat being concentrated along the base of the path of said helicoidal ridges.

ALBERT B. TRENCAVEL.